US008458037B2

(12) United States Patent
Kairis, Jr.

(10) Patent No.: US 8,458,037 B2
(45) Date of Patent: Jun. 4, 2013

(54) ELECTRONICALLY MAINTAINED COMMUNITY ESCROW

(75) Inventor: Richard J. Kairis, Jr., Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 166 days.

(21) Appl. No.: 12/953,043

(22) Filed: Nov. 23, 2010

(65) Prior Publication Data

US 2012/0130833 A1    May 24, 2012

(51) Int. Cl.
    *G06G 1/12*    (2006.01)
(52) U.S. Cl.
    USPC ................................ 705/21; 705/16
(58) Field of Classification Search
    CPC ... G06Q 20/00; G06Q 20/387; G06Q 20/0238;
                                    G07F 9/06; G07G 1/00
    USPC .............................. 705/21, 39; 235/492, 380
    See application file for complete search history.

(56) References Cited

U.S. PATENT DOCUMENTS

| | | | | |
|---|---|---|---|---|
| 5,869,826 | A | * | 2/1999 | Eleftheriou .................... 235/380 |
| 6,119,946 | A | * | 9/2000 | Teicher .......................... 235/492 |
| 2003/0040927 | A1 | | 2/2003 | Sato et al. |
| 2004/0222285 | A1 | | 11/2004 | Pohl |
| 2005/0251485 | A1 | | 11/2005 | Quigley |
| 2006/0097039 | A1 | | 5/2006 | Begola |
| 2007/0080213 | A1 | | 4/2007 | Workman et al. |
| 2007/0094130 | A1 | | 4/2007 | Burke |
| 2007/0131760 | A1 | | 6/2007 | Aggarwal |
| 2007/0156579 | A1 | | 7/2007 | Manesh |
| 2009/0313128 | A1 | | 12/2009 | Webb et al. |

FOREIGN PATENT DOCUMENTS

WO    2008022351 A2    2/2008

OTHER PUBLICATIONS

Nicole Smith, Service Collects Web 'Spare Change' for Charity, dmnews.com, Sep. 1, 2006.*
Charitable Giving at the Return Counter, The Retail Equation, 2011.*
Smith, "Service collects web 'spare change' for charity," Direct Marketing News, http://www.dmnews.com/service-collects-web-spare-change-for-charity/article/92571/, Sep. 1, 2006 (discussing web service available at www.changeroundup.com on the Internet).

* cited by examiner

*Primary Examiner* — Scott Zare
*Assistant Examiner* — Talia Crawley
(74) *Attorney, Agent, or Firm* — Michael Dryja

(57) ABSTRACT

Coin types of coins with which a user is permitted to pay for a transaction are divided into first and second groups. The coin types of the second group are of lower value than those of the first group. A difference in which a total amount of the transaction is a minuend is determined. Where the difference is positive and can only be exactly paid for by the user using just coins of the coin types of the second group, and where a community escrow has a current balance greater than the difference, the following is performed. In response to the user indicating that the difference should be paid for from the community escrow, the transaction is electronically credited from the community escrow by an amount equal to the difference, and the difference is electronically debited from the community escrow.

20 Claims, 3 Drawing Sheets

ELECTRONICALLY MAINTAINED COMMUNITY ESCROW

BACKGROUND

Many times when people are at stores, they pay cash for items instead of using debit cards or credit cards. As inflation has steadily increased over the years, the value of coins has lessened to the point where many people view many types of coins as a nuisance, and would rather not have a large amount of change jangling around in their pockets and purses. For example, in the United States, many people do not like to receive pennies back as change, and even nickels or dimes, and in some cases quarters as well, because they do not like carrying change in the form of such coins.

SUMMARY OF THE INVENTION

A method of an embodiment of the invention divides coin types of coins with which a user is permitted to pay for a transaction into a first group and a second group. The coin types of the second group are of lower value than the coin types of the first group. The method calculates a difference in which a total amount of the transaction is a minuend. Where the difference is positive and can only be exactly paid for by the user using just the coins of the coin types of the second group and not using any of the coins of the coin types of the first group, and where a community escrow electronically maintained by a computing device has a current balance greater than the difference, the following is performed. Specifically, in response to the user indicating the user wishes to have the difference paid for from the community escrow, in lieu of the user having to pay the difference, the transaction is electrically credited from the community escrow by an amount equal to the difference, by the computing device. The difference is also electrically debited from the community escrow, by the computing device.

A computer program product of an embodiment of the invention includes a computer-readable storage medium having computer-readable code embodied therein. The computer-readable code is executable by a computing device. The computer-readable code includes first computer-readable code to calculate a difference in which a total amount of a transaction is a minuend. The computer-readable code includes second computer-readable code as well. The second computer-readable code is to perform the following where the difference is positive and can only be paid by the user using just coins of coin types of a second group and not using any of the coins of the coin types of a first group, and where an electronically maintained community escrow has a current balance greater than the difference. Specifically, the second computer-readable code is to electronically credit the transaction from the community escrow by an amount equal to the difference and to electrically debit the difference from the community escrow. A user is permitted to pay for the transaction with the coins of the coin types. The coin types are divided into the first group and the second group. The coin types of the second group are of lower value than the coin types of the first group.

A system of an embodiment of the invention includes a point-of-sale (POS) mechanism disposable at a POS location within a store and with which a user is to interact when paying for a transaction. The POS mechanism includes one or more of a display device, an input device, a scanning device, a cash-receiving device, a credit and/or debit terminal device, and a change-payback device. The system includes a community escrow mechanism implemented at least in hardware to electronically maintain a community escrow. The community escrow mechanism is to calculate a difference in which a total amount of the transaction is a minuend. The community escrow mechanism is to perform the following, where the difference is positive and can only be paid by the user using just coins of coin types of the coin types of a second group and not using any of the coins of the coin types of a first group, and where the community escrow has a current balance greater than the difference. Specifically, the community escrow mechanism is to electronically credit the transaction from the community escrow by an amount equal to the difference and to electrically debit the difference from the community escrow. A user is permitted to pay for the transaction with the coins of the coin types. The coin types are divided into the first group and the second group. The coin types of the second group are of lower value than the coin types of the first group.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
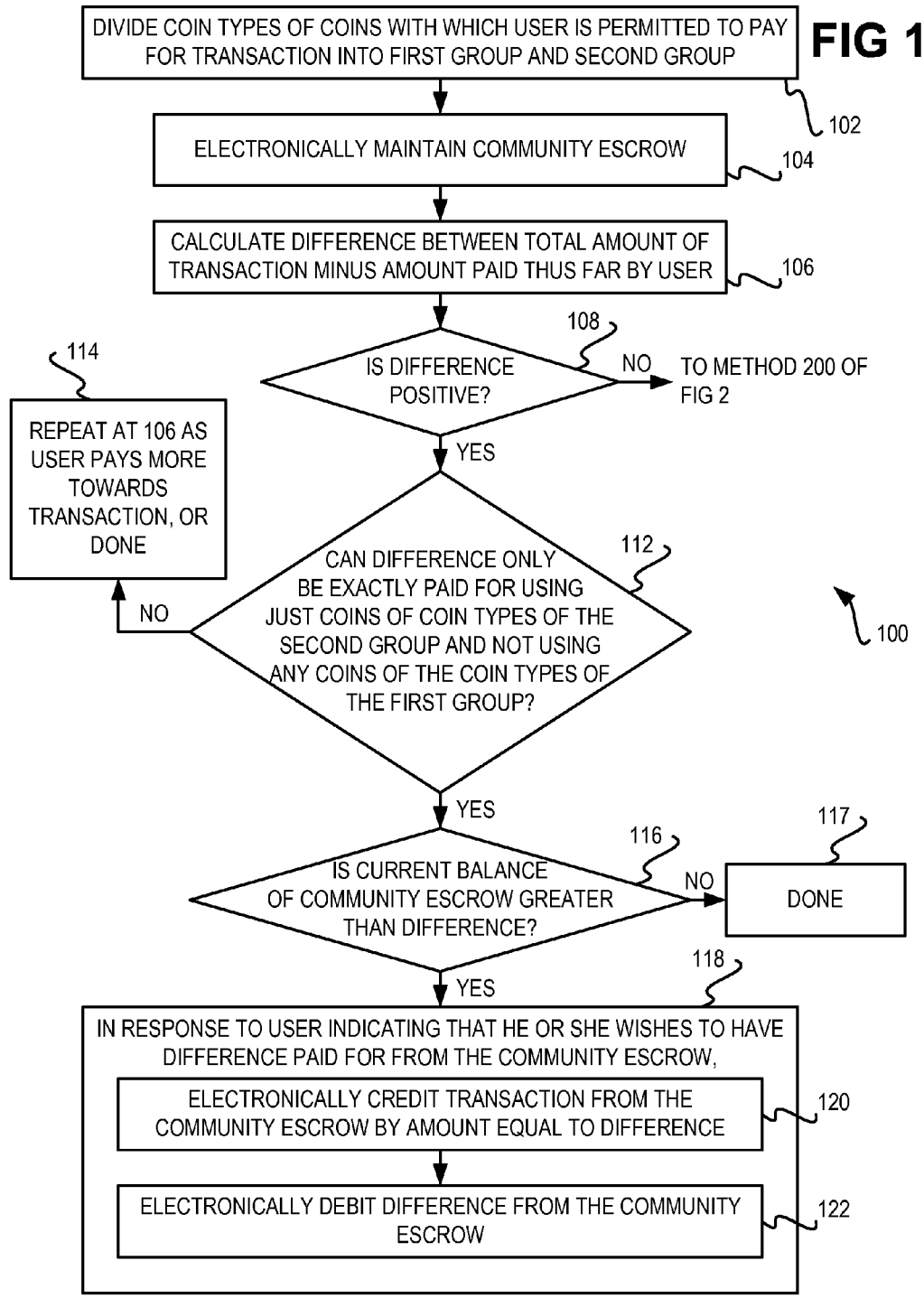
FIG. 1 is a flowchart of a method for using an electronically maintained community escrow from the perspective of a user who is paying for a transaction and who may be able to use some of the money maintained within the community escrow to help pay for the transaction, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, many people do not like receiving certain types of coins as change. To accommodate this situation, some stores maintain penny trays. A penny tray is a tray in which people that do not want to keep their change can deposit some of these coins. The coins can then be used by other people to pay for a transaction, such as when they are short on change or do not want to "break" paper currency, such as a dollar bill in the United States. The term transaction is used herein to denote the paying for one or more items or services within a store, typically at a point-of-sale (POS) location like a cashier-manned checkout lane or a self-checkout lane.

For example, in the United States, a user may receive back seven cents back in change in the form of two pennies and a nickel. This user may decide to deposit the two pennies in a penny tray, and even the nickel as well. Another user may then purchase something that costs US$1.02, but may have only one dollar, or may have only paper currency. Therefore, this user may decide to take two pennies from the penny tray to complete his or her transaction.

Penny trays are thus a way for users to share small amounts of change with one another in a distributed manner. Users are prevented from taking all the coins in a penny tray in large part because of the social stigma in doing so. That is, when checking out at a cash register in a store, a user interacts with a cashier. Because the cashier is watching the user, the user is socially inhibited from simply pocketing all the coins that are present within the penny tray.

However, more recently self-checkout lanes have become prevalent at certain types of retailers. A user checks him or herself out at a self-checkout lane by scanning the items that the user wishes to purchase, and then paying for the items, all without assistance from a cashier. Typically there is one employee that oversees multiple self checkout lanes, such as four or more.

Therefore, penny trays do not function as well in these and other sorts of settings. In particular, the social stigma preventing a user from taking all the coins in a penny tray is hampered by the fact that typically no one is closely watching the user as the user checks him or herself out at a self-checkout lane. Therefore, penny trays have seen decreasing usage, to the detriment of users who may benefit from them.

Disclosed herein is in effect a virtual penny tray, referred to as an electronically maintained community escrow. If a user is due change back, the user may be asked whether he or she instead wants at least a portion of this change deposited into such a community escrow. If a user is paying for an item that requires a small number of lesser-value coins, the user may similarly be asked whether he or she prefers to effectively take these coins virtually from the community escrow.

The electronically maintained community escrow overcomes the problems associated with a physical penny tray noted above. In particular, electronically maintained community escrows can be effectively used even in self-checkout lanes. This is because a user does not have the ability to take the entire balance present in the community escrow, but rather is given the opportunity to use the escrow just when a small number of lesser-value coins is required to complete his or her purchase.

Furthermore, an electronically maintained community escrow provides for other benefits that are impossible to achieve with a physical penny tray. A physical penny tray typically only services one cash register, or a small number of cash registers that are in very close physical proximity to one another in a store. By comparison, a community escrow can also be electronically maintained over all the POS locations within a store, regardless of their physical proximity to one another.

FIG. 1 shows a method 100 for using an electronically maintained community escrow from the perspective of a user who is paying for a transaction and who may be able to use some of the money maintained within the community escrow to help pay for the transaction, according to an embodiment of the invention. For example, a user may be using a self-checkout lane at a store. As another example, a user may be completing a transaction at another type of POS location within a store, such as a cash register. In the latter example, the user may be able to interact with a display device and/or an input device, such as a credit and/or debit terminal in addition to a cashier, or the user may interact with only the cashier.

Coin types of coins with which a user is permitted to pay for the transaction are divided into a first group and a second group (102), where the coin types of the second group are of lower value than the coin types of the first group. The first group of coin types represents the coins that the user will not be permitted to virtually take from the community escrow to help pay for the transaction. The second group of coin types represents the coins that the user will be permitted to virtually take from the community escrow to help pay for the transaction.

For example, in the United States, consumers typically use quarters equal to twenty-five cents, dimes equal to ten cents, nickels equal to five cents, and pennies equal one cent. Quarters and dimes may be assigned to the first group, and nickels and pennies may be assigned to the second group. As another example, quarters, dimes, and nickels may be assigned to the first group, and pennies to the second group. As a third example, only quarters may be assigned to the first group, and dimes, nickels, and pennies to the second group.

The community escrow is electronically maintained by a computing device (104). An example of such a computing device is described later in the detailed description in relation to a system. In one embodiment, the community escrow is maintained on a store-wide basis. As such, the community escrow is electronically shareable at all POS locations within the store, such that there is only one community escrow in the store. This means that there is a common community escrow to which credits can be made by users at any POS location within the store, and from which likewise debits can be made at any POS location within the store.

In another embodiment, the community escrow is maintained on a per POS location basis. As such, the community escrow at a POS location within a store is not electronically shareable at any other POS location within the store. For example, if there are four self-checkout lanes within a store, each self-checkout lane may be associated with its own community escrow. A user at one self-checkout lane cannot contribute to or deduct from the community escrow of any self-checkout lane other than the one that the user is currently using.

A difference between the total amount of the transaction minus an amount that the user has thus far paid in cash for the transaction is calculated (106). For example, the user may be buying groceries, which total US$10.03. The user may have inserted a ten dollar bill into a cash-receiving device at a self-checkout lane, or may have given a cashier the ten dollar bill. Therefore, the difference in question is US$0.03.

More generally, the difference calculated in part 106 is said to be a difference in which the total amount of the transaction is the minuend. It is noted that in a subtraction calculation of the form A−B=C, the value A is the minuend, the value B is the subtrahend, and the value C is the difference. In the example noted in the previous example, therefore, the amount that the user has thus far paid in cash for the transaction is the subtrahend.

Furthermore, the difference may be calculated in part 106 in an alternative embodiment even before the user has paid for a portion of the transaction. For instance, the difference may be calculated as the total amount of the transaction minus a maximum amount that can only be exactly paid for by the user using just coins of the coin types of the first group and not using any of the coins of the coin types of the second group. In this alternative embodiment, the maximum amount that can only be exactly paid for by the user using just coins of the coin types of the first group and not using any of the coins of the coin types of the second group is the subtrahend.

As an example of this alternative embodiment, the total amount of the transaction may be US$2.03. The coin types of the first group may include quarters and dimes, and the coin types of the second group may include nickels and pennies. Therefore, the maximum amount that can be paid by using just coins having coin types of the first group is US$2.00, since US$0.03 cannot be paid by using quarters and/or dimes. The difference calculated in part 106 in this example of the alternative embodiment is US$2.03−US$2.00=US$0.03.

Figure 2:
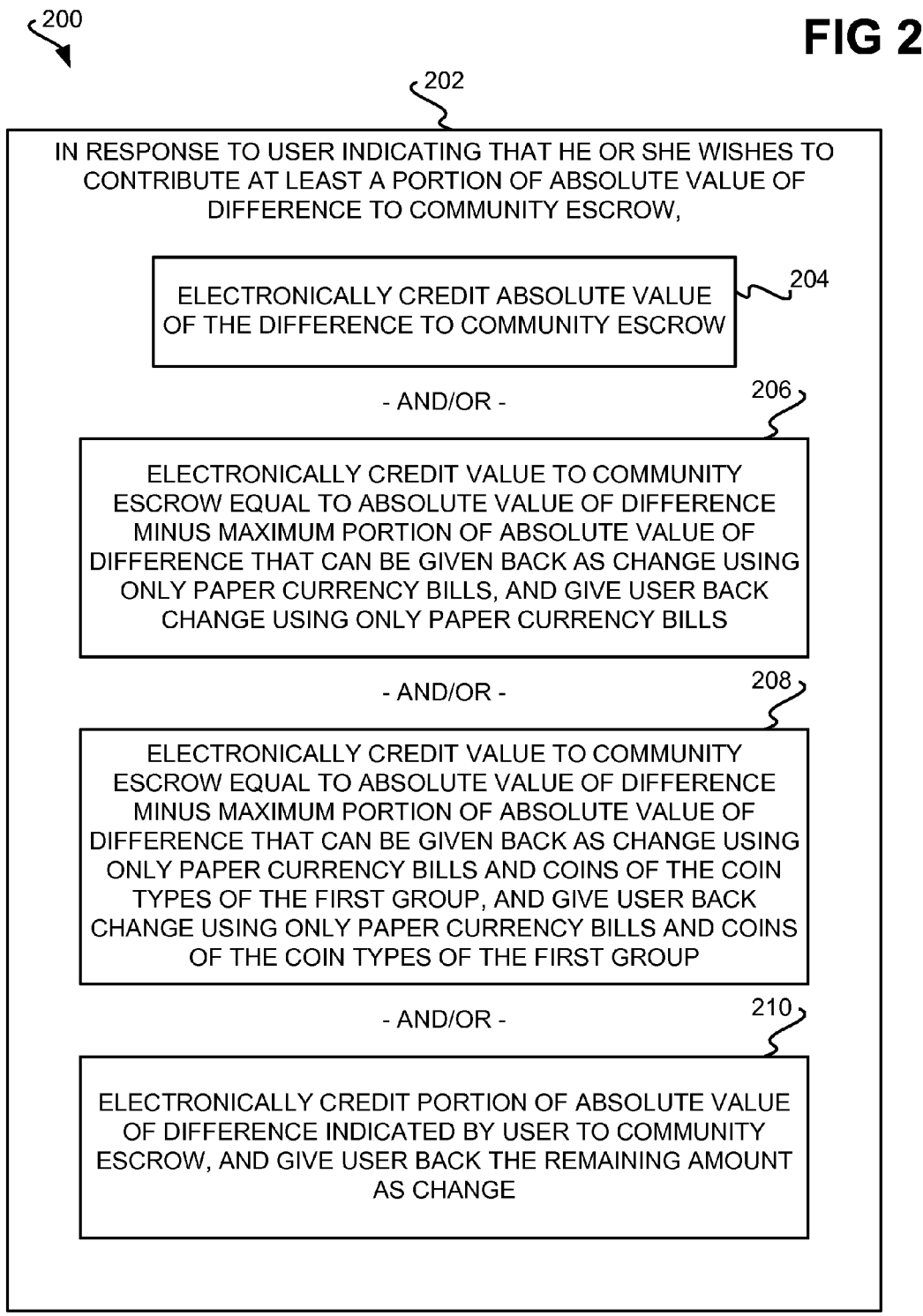
FIG. 2 is a flowchart of a method for using an electronically maintained community escrow from the perspective of a user who is paying for a transaction and who may decide to contribute at least a portion of the change due back to him or her to the community escrow, according to an embodiment of the invention.

If the difference calculated in part 106 is not positive (108), then the method 100 proceeds to the method 200 of FIG. 2. That is, if the user has paid more than the amount of the transaction, then the user does not have the opportunity to use the community escrow to help pay for the transaction. By comparison, if this difference is positive (108), such as in the example of the previous paragraph, then the method 100 continues.

Whether the difference can only be exactly paid for using just coins of the coin types of the second group, and not by using any coins of the coin types of the first group, is determined (112). Assume, for instance, that the first group includes quarters and dimes and that the second group includes nickels and pennies. Therefore, where the difference calculated in part 106 is US$0.03, the difference can indeed only be exactly paid for using just coins of the coin types of the second group, specifically using three pennies. A coin of a coin type of the first group, such as a quarter or a dime, would not yield exact payment for this difference, in other words.

As another example, if the difference calculated in part 106 is US$0.27, the difference cannot only be exactly paid for using just nickels and pennies, and not using quarters or dimes. For instance, while this difference can be paid for by using five nickels and two pennies, the difference can also be paid for by using a quarter and two pennies, or two dimes, a nickel, and two pennies. As a third example, if the difference calculated in part 106 is US$1.02, the difference cannot only be exactly paid for using just nickels and pennies, and not using quarters or dimes. For instance, the difference could be paid for by using four quarters and two pennies.

If the difference cannot only be exactly paid for using just coins of the coin types of the second group, and not by using any coins of the coin types of the first group (112), then the method is 100 either finished, or is repeated at part 106 (114). In the latter case, in one embodiment, the method 100 is repeated at part 106 each time a user continues to pay for the transaction. For instance, in the case of a self-checkout lane, the user may pay for the transaction by individually inserting paper currency and coins into a cash-receiving device. Each time the user inserts paper currency or a coin, the method 100 can be repeated at part 106.

For example, the total amount of the transaction may be US$6.02. The user may insert a five dollar bill. The difference is calculated in part 106 as US$1.02. This difference is positive, so the method 100 proceeds from part 108 to part 112. However, the difference cannot only be exactly paid for using just coins of coin types of the second group and not using any coins of the coin types of the first group. The method 100 thus proceeds from 112 to part 114, and the method 100 is repeated at part 106. The user may next insert a one dollar bill, bringing the total amount paid thus far to US$6.00. The difference is calculated in part 106 as US$0.02, which is also positive, so the method proceeds from part 108 to part 112. This difference can only be exactly paid for using just coins of coin types of the second group and not using any coins of the coin types of the first group. As such, the method does not proceed from part 112 to part 114.

In another embodiment, the method 100 is never repeated at part 106. As such, in this embodiment, part 106 is performed only once, after the user has finished paying for the transaction. This embodiment is particularly apropos where the user pays for a transaction by handing money to a cashier. If the total amount of the transaction is US$7.53, the user may hand the cashier a five dollar bill, two one dollar bills, and two quarters. As such, the difference is calculated in part 106 as US$0.03.

Similarly, in conjunction with the alternative embodiment noted above in relation to part 106, the method 100 may be performed only once, but before the user has begun paying for the transaction. For example, the total amount of the transaction may be US$7.53. If quarters and dimes are in the first group of coin types, and nickels and pennies are in the second group of coin types, then the user may be informed that he or she can take advantage of the community escrow, but only for US$0.03, since US$7.50 can be paid by using quarters and dimes, and US$0.03 cannot be paid by using quarters and dimes.

If the difference can only be exactly paid for using just coins of the coin types of the second group, and not by using any coins of the coin types of the first group (112), then it is determined whether the current balance of the community escrow is greater than the difference calculated in part 106 (116). If the current balance of the community escrow is not greater than the difference (116), then the community escrow may not be able be used to help pay for the transaction, such that the method 100 is finished (117). However, if the current balance of the community escrow is greater than the difference, then the user is requested whether or not he or she would like to have the difference paid for from the community escrow (118).

For example, a user may be asked whether or not he or she would like to have the difference paid for from the community escrow on a display device at the POS location in question. Such a display device may be present regardless of whether the user is in a cashier-manned checkout lane of a store or in a self-checkout lane of the store. In response, the user may press a physical or virtual button of an input device, such as a touchscreen, corresponding to his or her answer. As another example, a cashier may ask the user this question, and in response the cashier or the user may press a physical or virtual button of an input device corresponding to the user's answer.

In response to the user indicating that he or she wishes to have the difference paid for from the community escrow, the following is performed (118). The computing device electronically credits the transaction from the community escrow by an amount equal to the difference (120). The computing device also electronically debits the difference from the community escrow (122).

FIG. 2 shows a method 200 for using the electronically maintained community escrow from the perspective of a user who is paying for a transaction and who may decide to contribute at least a portion of the change due back to him or her to the community escrow, according to an embodiment of the invention. The method 200 can be performed in conjunction with at least a portion of the method 100. For instance, as noted above, if the difference calculated in part 106 of the method 100 is not positive, then the method 100 proceeds from part 108 to the method 200. For example, the total amount of the transaction may be US$9.97, and the user may have paid with a ten dollar bill. As such, the difference in question is −US$0.03, such that the method 100 proceeds from part 108 to the method 200.

The method 200 is therefore performed when the total amount of the transaction minus the amount paid thus far by the user for the transaction is negative—that is, when the user has paid more than the total amount, and would ordinarily be due back change. It is determined whether the user indicates that he or she wishes to contribute at least a portion of the absolute value of the difference to the community escrow (202). For example, if the difference in question is −US$0.79, it is determined whether the user wishes to contribute up to seventy-nine cents to the community escrow.

A user may be asked whether or not he or she would like to contribute money to the community escrow on a display device at the POS location in question. Such a display device may be present regardless of whether the user is in a cashier-manned checkout lane of a store or in a self-checkout lane of the store. In response, the user may press a physical or virtual button of an input device, such as a touchscreen, corresponding to his or her answer. As another example, a cashier may ask the user this question, and in response the cashier or the user may press a physical or virtual button of an input device corresponding to the user's answer.

One or more of the following is then performed responsive to the user indicating that he or she wishes to contribution at least a portion of the absolute value of the difference (i.e., the change due back to the user) to the community escrow (202). First, the absolute value of the entire difference can be electronically credited to the community escrow by the computing device (204). For example, the user may be owed US$0.79 in change, and be asked whether he or she wants to contribute the entire amount owed, in lieu of the user receiving this amount back as change. In this case, the user does not receive any change back in part 204.

Second, a value equal to the absolute value of the difference minus the maximum portion of this absolute value that can be given back as change using only paper currency (and not coins of the coin types of the first or second groups) can be electronically credited to the community escrow by the computing device (206). For example, the user may be owed US$6.13 in change, such that it is determined that the maximum amount that can be given back to the user in change using only paper currency is US$6.00. The user may be asked whether he or she wants to contribute US$0.13, such that the user receives just US$6.00 back as change. In this case, the user receives back change equal to the maximum portion of the absolute difference that can be given back to the user using only paper currency bills. In the example, the user may be given a five dollar bill and a one dollar bill, for instance, or six dollar bills.

Third, a value equal to the absolute value of the difference minus the maximum portion of this absolute value that can be given back as change using only paper currency and coins of the coin types of the first group, and not using coins of the coin types of the second group, can be electronically credited to the community escrow by the computing device (208). For example, the user may be owed US$6.27 in change, such that it is determined that the amount that can be given back to the user in change using only paper currency and coins of coin types of the first group (which include quarters but not pennies) is US$6.25. The user may be asked whether he or she wants to contribute US$0.02, such that the user receives back just US$6.25 as change.

As another example, the user may be owed US$0.23 in change. It is determined that the amount that can be given back to the user in change using only paper currency and coins of coin types of the first group (which include dimes but not pennies) is US$0.20. The user may be asked whether he or she wants to contribute US$0.03, such that the user receives back just US$0.20 as change.

In one embodiment, the coin types may be re-divided between the first and second groups when asking the user whether he or she wishes to contribute change to the community escrow in part 208. Re-dividing the coin types may be performed so that more of the coin types are within the second group as compared to in the first group, such that the user is encouraged to contribute more change to the community escrow. For instance, a user may be permitted to use (i.e., take) just pennies and nickels from the community escrow, such that the user can take only up to US$0.09 from the community escrow. However, a user may be permitted to contribute pennies, nickels, and dimes to the community escrow, such that the user can contribute up to US$0.24 to the escrow.

In this embodiment, two differences may be calculated in part 106 of the method 100 of FIG. 1: one for determining whether a user is permitted to use the community escrow, and another for determining whether the user should be asked whether he or she wishes to contribute to the escrow. The former difference has less coin types within the second group, and controls whether the method 100 proceeds from part 108 to 112. By comparison, the latter difference controls whether the method 100 proceeds from part 108 to the method 200.

Fourth, a portion of the absolute value of the difference as indicated by the user may be electronically credited to the community escrow by the computing device (210). For example, the user may be owed US$0.99 in change, and may indicate in response to a request that he or she wishes to contribute US$0.24. In this case, the user may be able to receive back just three quarters in change, but in any case is given back change equal to the absolute value of the difference minus the amount that the user indicated is to be contributed to the community escrow.

The embodiments of parts 204, 206, 208, and 210 can be combined. For example, the entire absolute value of the difference may be displayed to the user pursuant to part 204, along with just the portion of the absolute value pursuant to part 206 and just the portion of the absolute value pursuant to part 208. These three values may be displayed as virtual or soft buttons on a touchscreen, for instance. Another button may also be displayed corresponding to part 210, where this button is labeled "other amount." Depending on the user's selection, either part 204, 206, 208, or 210 is performed. A fifth button displayed as "no amount; give me my change" may further be displayed, in which case part 202 of the method 200 is not performed.

For example, the absolute value of the difference may be US$1.27. Therefore, along with buttons labeled "no amount; give me my change" and "other amount," three buttons having the following values may be displayed to the user: US$1.27, pursuant to part 204; US$0.27, pursuant to part 206; and US$0.02, pursuant to part 208. The user can then decide to select one of these five buttons to contribute at least a portion of the change back due to him or her, if any, to the community escrow.

Figure 3:
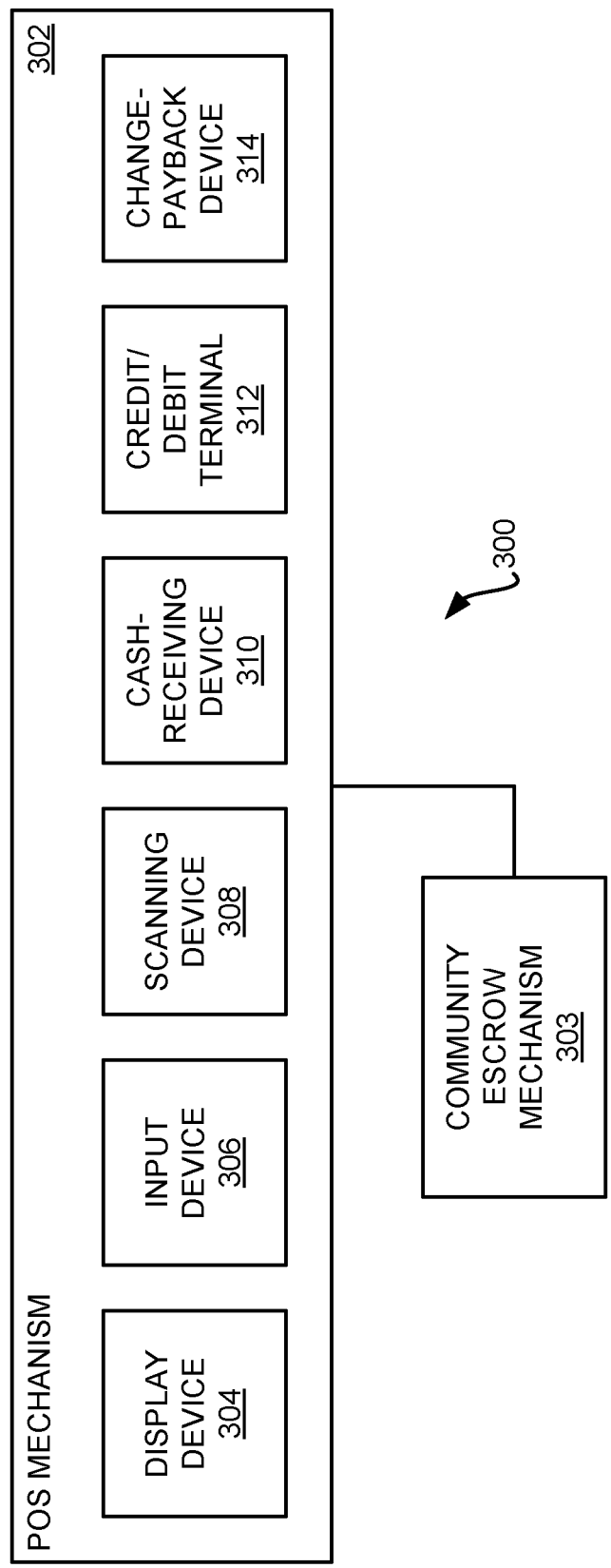
FIG. 3 is a diagram of a system, according to an embodiment of the invention.

FIG. 3 shows a system 300, according to an embodiment of the invention. The system 300 includes a POS mechanism 302 and a community escrow mechanism 303. There may be more than one POS mechanism 302, in which case the community escrow mechanism 303 may be operable for all the POS mechanisms 302. As another example, however, there may instead be a community escrow mechanism 303 for each POS mechanism 302.

The POS mechanism 302 is disposable at a POS location within a store, such as a cashier-manned checkout lane or a self-checkout lane of the store, for instance. A user interacts with the POS mechanism 302 when paying for a transaction. The POS mechanism 302 can include one or more of the following: a display device 304, an input device 306, a scanning device 308, a cash-receiving device 310, a credit and/or debit terminal 312, and a change-payback device 314, among other types of devices.

The display device 304 permits information to be displayed to the user, whereas the input device 306 permits the user to enter information. The devices 304 and 306 can be combined into a single touchscreen device in one embodiment, but may alternatively be separate devices. The scanning device 308 permits a user or a cashier to scan the barcodes or other types of machine-readable codes of items that the user is purchasing as part of the transaction. Another type of scanning device 308 is one that wirelessly retrieves information from radio frequency (RF) tags of the items.

The cash-receiving device 310 permits a user to enter cash, such as paper currency as well as coins, to pay for the items, and is typically present in the case where the POS location is a self-checkout lane. The credit and/or debit terminal 312 permits a user to instead pay using a credit card or a debit card, and may include a magnetic card reader to read the magnetically encoded information of such a card. The change-payback device 314 automatically dispenses change, such as paper currency as well as coins, which is due back to the user, and is also typically present in the case where the POS location is a self-checkout lane.

The community escrow mechanism 303 is implemented at least in hardware. For example, the community escrow mechanism 303 may be a computer program that is stored on a computer-readable data storage medium and that is executed by a processor of a computing device. The community escrow mechanism 303 thus performs the parts of the methods 100 and 200 of FIGS. 1 and 2 that have been ascribed as being performed by a computing device. As such, the community escrow mechanism 303 determines a difference between a total amount of the transaction and the amount paid thus far by the user. The community escrow mechanism 303 then determines whether to electronically debit this difference from the community escrow or electronically credit the difference to the community escrow, as described above. The community escrow mechanism 303 thus electronically maintains the community escrow that has been described herein.

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A method comprising:
  dividing, by a processor, a plurality of coin types of coins with which a user is permitted to pay for a transaction into a first group and a second group, the coin types of the second group being of lower value than the coin types of the first group;
  calculating, by the processor, a difference in which a total amount of the transaction is a minuend;
  where the difference is positive and can only be exactly paid for by the user using just the coins of the coin types of the second group and not using any of the coins of the coin types of the first group, and where a community escrow electronically maintained by a computing device has a current balance greater than the difference,
    in response to the user indicating the user wishes to have the difference paid for from the community escrow, in lieu of the user having to pay the difference,
      electronically crediting the transaction from the community escrow by an amount equal to the difference, by the computing device; and,
      electronically debiting the difference from the community escrow, by the computing device,
  wherein the community escrow is an electronically maintained tally of money functioning as a virtual penny tray.

2. The method of claim 1, wherein the difference is calculated as the total amount of the transaction minus an amount paid thus far by the user for the transaction in cash.

3. The method of claim 1, wherein the difference is calculated as the total amount of the transaction minus a maximum amount of the transaction that can only be exactly paid for by the user using just the coins of the coin types of the first group and not using any of the coins of the coin types of the second group.

4. The method of claim 1, wherein the user is a first user, the transaction is a first transaction, the difference is a first difference, and wherein the method further comprises:
  calculating a second difference between a total amount of a second transaction minus an amount paid by a second user for the second transaction; and,
  where the second difference is negative, and in response to the user indicating that the user wishes to contribute an amount owed the user equal to an absolute value of the second difference to the community escrow, in lieu of the user receiving the amount owed to the user as change back,
    electronically crediting the absolute value of the second difference to the community escrow, by the computing device, such that the user does not receive any change back.

5. The method of claim 1, wherein the user is a first user, the transaction is a first transaction, the difference is a first difference, and wherein the method further comprises:
  calculating a second difference between a total amount of a second transaction minus an amount paid by a second user for the second transaction;
  where the second difference is negative, determining a value equal to an absolute value of the second difference minus a maximum portion of the second difference that can be given back as change to the user using only paper currency bills and not coins of the coin types of the first group and not coins of the coin types of the second group; and,
  in response to the user indicating that the user wishes to contribute the value to the community escrow, in lieu of the user receiving the value as part of the amount owed to the user as change back,
    electronically crediting the value to the community escrow, by the computing device;
    giving the user change back equal to the maximum portion of the absolute value of the second difference that can be given back to the user using only paper currency bills.

6. The method of claim 1, wherein the user is a first user, the transaction is a first transaction, the difference is a first difference, and wherein the method further comprises:
  calculating a second difference between a total amount of a second transaction minus an amount paid by a second user for the second transaction;
  where the second difference is negative, determining a value equal to an absolute value of the second difference minus a maximum portion of the second difference that can be given back as change to the user using only paper currency bills and coins of the coin types of the first group and not coins of the coin types of the second group; and, in response to the user indicating that the user wishes to contribute the value to the community escrow, in lieu of the user receiving the value as part of the amount owed to the user as change back, electronically crediting the value to the community escrow, by the computing device;

giving the user change back equal to the maximum portion of the absolute value of the second difference that can be given back to the user using only paper currency bills and coins of the coin types of the first group.

7. The method of claim 6, further comprising re-dividing the plurality of coin types of the coins into a first group and a second group, the coin types of the second group being of lower value than the coin types of the first group, wherein after re-dividing, more of the coin types are within the second group.

8. The method of claim 1, wherein the user is a first user, the transaction is a first transaction, the difference is a first difference, and wherein the method further comprises:

calculating a second difference between a total amount of a second transaction minus an amount paid by a second user for the transaction;

where the second difference is negative, and in response to the user indicating that the user wishes to contribute a portion of an absolute value of the second difference owed to the user as change back to the community escrow, in lieu of the user receiving all the absolute value of the second difference owed to the user as change back, requesting that the user indicate the portion that the user wishes to contribute to the community escrow;

electronically crediting the portion to the community escrow, by the computing device;

giving the user change back equal to the absolute value of the second difference owed to the user minus the portion that has been electrically credited to the community escrow.

9. The method of claim 1, wherein the difference is a first difference, and wherein the method further comprises:

calculating a second difference between the total amount of the transaction minus a second amount paid thus far by the user for the transaction in cash, where the second amount is equal to a first amount paid by the user for the transaction in cash plus an additional amount paid by the user for the transaction in cash;

where the second difference is positive and can only be exactly paid for by the user using just the coins of the coin types of the second group and not using any of the coins of the coin types of the first group, and where a community escrow electronically maintained by a computing device has a current balance greater than the second difference, in response to the user indicating the user wishes to have the second difference paid for from the community escrow, in lieu of the user having to pay the second difference, electronically crediting the transaction from the community escrow by an amount equal to the second difference, by the computing device; and, electronically debiting the second difference from the community escrow, by the computing device.

10. The method of claim 1, wherein calculating the difference in which the total amount of the transaction is the minuend comprises calculating the difference only once, after the user has finished paying for the transaction.

11. The method of claim 1, further comprising electronically maintaining the community escrow on a store-wide basis, such that the community escrow is electronically shareable at all point-of-sale (POS) locations within a store, and such that the community escrow is an only community escrow electronically maintained within the store.

12. The method of claim 1, further comprising electronically maintaining the community escrow on a per point-of-sale (POS) location basis, such that the community escrow at a POS location within a store is not electronically shareable at any other POS location within the store.

13. A computer program product comprising:

a non-transitory computer-readable storage medium having computer-readable code embodied therein, the computer-readable code executable by a computing device, the computer-readable code comprising:

first computer-readable code to calculate a difference in which a total amount of a transaction is a minuend; and, second computer-readable code to, where the difference is positive and can only be paid by the user using just coins of coin types of a second group and not using any of the coins of the coin types of a first group, and where an electronically maintained community escrow has a current balance greater than the difference, electronically credit the transaction from the community escrow by an amount equal to the difference and to electrically debit the difference from the community escrow, wherein a user is permitted to pay for the transaction with the coins of the coin types, the coin types are divided into the first group and the second group, and the coin types of the second group are of lower value than the coin types of the first group, and wherein the community escrow is an electronically maintained tally of money functioning as a virtual penny tray.

14. The computer program product of claim 13, wherein the user is a first user, the transaction is a first transaction, the difference is a first difference, wherein the first computer-readable code is to calculate a second difference between a total amount of a second transaction minus an amount paid by a second user for the second transaction, and wherein the computer-readable code further comprises third computer-readable code to, where the difference is negative, electronically credit at least a portion of the absolute value of the difference to the community difference.

15. The computer program product of claim 13, wherein the first computer-readable code is to calculate the difference a plurality of times in which the user increases the amount paid thus far.

16. The computer program product of claim 13, wherein the first computer-readable code is to calculate the difference only once, after the user has finished paying for the transaction.

17. The computer program product of claim 13, wherein the community escrow is maintained on one of:

a store-wide basis, such that the community escrow is electronically shareable at all point-of-sale (POS) locations within a store, and such that the community escrow is an only community escrow electronically maintained within the store; and, a per point-of-sale (POS) location basis, such that the community escrow at a POS location within a store is not electronically shareable at any other POS location within the store.

18. A system comprising:
a point-of-sale (POS) hardware terminal disposable at a POS location within a store and with which a user is to interact when paying for a transaction, the POS hardware terminal comprising one or more of a display device, an input device, a scanning device, a cash-receiving device, a credit and/or debit terminal device, and a change-payback device; and,
a community escrow application to electronically maintain a community escrow,
wherein the community escrow application is to calculate a difference in which a total amount of the transaction is a minuend,
and wherein the community escrow application is to, where the difference is positive and can only be paid by the user using just coins of coin types of the coin types of a second group and not using any of the coins of the coin types of a first group, and where the community escrow has a current balance greater than the difference, electronically credit the transaction from the community escrow by an amount equal to the difference and to electrically debit the difference from the community escrow,
wherein a user is permitted to pay for the transaction with the coins of the coin types, the coin types are divided into the first group and the second group, and the coin types of the second group are of lower value than the coin types of the first group,
wherein the community escrow is an electronically maintained tally of money functioning as a virtual penny tray.

19. The system of claim 18, wherein the user is a first user, the transaction is a first transaction, the difference is a first difference,
wherein the community escrow application is to calculate a second difference between a total amount of a second transaction minus an amount paid by a second user for the second transaction,
and wherein the community escrow application is further to, where the difference is negative, electronically credit at least a portion of the absolute value of the difference to the community difference.

20. The system of claim 18, wherein the community escrow application is to electronically maintain the community escrow on one of:
a store-wide basis, such that the community escrow is electronically shareable at all point-of-sale (POS) locations within the store, and such that the community escrow is an only community escrow electronically maintained within the store;
a per point-of-sale (POS) location basis, such that the community escrow at the POS location within the store is not electronically shareable at any other POS location within the store.

* * * * *